United States Patent
Nordlöw et al.

(10) Patent No.: US 11,522,602 B2
(45) Date of Patent: Dec. 6, 2022

(54) METHOD AND COMPONENT FOR DETERMINING A FREQUENCY SPECTRUM FOR WIRELESS AIRCRAFT IN-CABIN COMMUNICATION

(71) Applicant: Telefonaktiebolaget LM Ericsson (publ), Stockholm (SE)

(72) Inventors: Anders Nordlöw, Hässelby (SE); Mikael Prytz, Rönninge (SE); Imadur Rahman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 75 days.

(21) Appl. No.: 16/766,278

(22) PCT Filed: Nov. 23, 2017

(86) PCT No.: PCT/SE2017/051161
§ 371 (c)(1),
(2) Date: May 21, 2020

(87) PCT Pub. No.: WO2019/103668
PCT Pub. Date: May 31, 2019

(65) Prior Publication Data
US 2020/0373998 A1    Nov. 26, 2020

(51) Int. Cl.
*H04W 72/04* (2009.01)
*H04B 7/185* (2006.01)
(52) U.S. Cl.
CPC ........ *H04B 7/18506* (2013.01); *H04W 72/04* (2013.01)

(58) Field of Classification Search
None
See application file for complete search history.

(56) References Cited

U.S. PATENT DOCUMENTS

| 10,764,804 B2* | 9/2020 | Hyslop | H04W 36/20 |
| 2004/0253949 A1 | 12/2004 | Swensen et al. | |
| 2007/0112479 A1* | 5/2007 | Wright | G08G 5/065 701/3 |

(Continued)

FOREIGN PATENT DOCUMENTS

| EP | 2933931 A2 | 10/2015 |
| WO | 0203572 A1 | 1/2002 |

OTHER PUBLICATIONS

International Search Report and Written Opinion for International Application No. PCT/SE2017/051161, dated Aug. 7, 2018, 9 pages.

(Continued)

*Primary Examiner* — Kodzovi Acolatse
(74) *Attorney, Agent, or Firm* — Nicholson De Vos Webster & Elliott LLP (57) ABSTRACT

A method and component for determining a spectrum for wireless in-cabin communication between a user equipment and a network node which are within an aircraft. The method comprises obtaining flight information indicating a position of the aircraft; determining one or more available spectrums based on a regulation on an allowed spectrum corresponding to the flight information at the position; and sending, to at least one of the user equipment and the network node, an instruction to use the one or more available spectrums for the wireless in-cabin communication.

15 Claims, 3 Drawing Sheets

(56) References Cited

U.S. PATENT DOCUMENTS

| | | | |
|---|---|---|---|
| 2007/0213009 A1* | 9/2007 | Higashida | H04B 7/18508 |
| | | | 455/3.06 |
| 2012/0034917 A1* | 2/2012 | Kazmi | H04W 48/16 |
| | | | 455/434 |
| 2012/0295537 A1 | 11/2012 | Zaruba et al. | |
| 2015/0316575 A1* | 11/2015 | Shams | G08G 5/0021 |
| | | | 73/170.13 |
| 2019/0239134 A1* | 8/2019 | Hyslop | H04W 72/082 |
| 2020/0187031 A1* | 6/2020 | Kazmi | H04W 64/006 |

OTHER PUBLICATIONS

ECC Decision (06)07, dated Jun. 30, 2017, 11 pages, CEPT ECC Electronic Communications Committee.
International Preliminary Report on Patentability for International Application No. PCT/SE2017/051161, dated Jun. 4, 2020, 7 pages.
Communication under Rule 71(3) EPC for Application No. 17818649.0, dated Jul. 14, 2021, 56 pages.
Decision to grant a European patent pursuant to Article 97(1) EPC for Application No. 17818649.0, dated Sep. 2, 2021, 2 pages.

* cited by examiner

METHOD AND COMPONENT FOR DETERMINING A FREQUENCY SPECTRUM FOR WIRELESS AIRCRAFT IN-CABIN COMMUNICATION

CROSS-REFERENCE TO RELATED APPLICATIONS

This application is a National stage of International Application No. PCT/SE2017/051161, filed Nov. 23, 2017, which is hereby incorporated by reference.

TECHNICAL FIELD

Embodiments herein relate to wireless in-cabin communication. In particular, a method and component for determining a spectrum for wireless in-cabin communication. A corresponding computer program and a computer program carrier are also disclosed.

BACKGROUND

Air-to-ground communication is the means by which people on the ground and those in an airborne communicate with each other.

There is today a rapidly developing and changing environment for communication towards airplanes and inside airplanes. In this air communication environment airplanes will co-exist with a world of drones and military applications.

Traditionally, airplanes has used satellite communication where data or voice traffic has been transported from in-cabin network, based on GSM and Wi-Fi technologies over satellite links, to the ground.

In other cases, airplanes use a 3GPP based network, instead of the satellite links, for communication to the ground. By utilizing a 3GPP based network, e.g., Long-Term Evolution (LTE), 5 generation (5G), new radio (NR) or further successors, the existing communication solutions can be expanded and give better advantages to both complement and replace existing solutions.

For Mobile Broadband (MBB) applications to high-flying aeroplanes, there are two main challenges. First, a seamless MBB experience with respect to the wireless in-cabin communication is required. For in-cabin wireless usage, it's a challenge to provide seamless connection from e.g., ground cellular network to in-cabin system, similar to connecting to its own network, i.e., not roaming. It is desired to maintain the session continuity handing over from a (MNO) ground network to an in-cabin network. One challenging issue is related to interference between ground communication and in-cabin communication, which depends on the spectrum used in the in-cabin network and the spectrum used in a ground network. Second, a high-performance backhaul network is expected. For seamless and high capacity in-cabin MBB experience, it is desired to provide an air-to-ground (A2G) link which is capable of extremely high capacity in terms of bitrate since we may have large number of passengers on board; and also reasonable Round Trip Time (RTT) delay such that real time applications can be supported. One possibility of air-to-ground system can be based on 3GPP NR and/or evolved LTE. For obtaining a high capacity link, one can exploit beamforming technologies and new frequencies where higher transmission bandwidth can be available.

However, none of the conventional solutions can provide a seamless wireless in-cabin communication during the whole flight.

SUMMARY

It is therefore an object of embodiments herein to provide a seamless wireless in-cabin communication.

According to an aspect, a method for determining a spectrum to be used for a wireless in-cabin communication between a user equipment and a network node which are within an aircraft is provided. The method comprises obtaining flight information indicating a position of the aircraft. The method also comprises determining one or more available spectrums based on a regulation on an allowed spectrum corresponding to the flight information at the position. The method further comprises sending, at least one of the user equipment and the network node, an instruction to use the one or more available spectrums for the wireless in-cabin communication.

According to another aspect, a component for determining a spectrum to be used for a wireless in-cabin communication between a user equipment and a network node which are within an aircraft is provided. The component comprises a processor configured to obtain flight information indicating a position of the aircraft; determine one or more available spectrums based on a regulation on an allowed spectrum corresponding to the flight information at the position; and send, to at least one of the user equipment and the network node, an instruction to use the one or more available spectrums for the wireless in-cabin communication.

According to another aspect, a computer program comprising computer readable program code is provided. The computer readable program code is configured to cause a computer to perform any embodiment of the preceding method when said computer program is run on the computer.

According to a further aspect, a computer program carrier is provided, which comprises the computer program as described above.

An advantage of the above aspects is to enable a seamless wireless in-cabin communication. Due to the available spectrums can be determined no matter in which position the aircraft is, a seamless wireless in-cabin communication is therefore enabled during the flight.

DETAILED DESCRIPTION

A seamless wireless in-cabin communication is provided herein. A seamless wireless in-cabin communication refers to a wireless in-cabin communication without any interruptions during the flight, i.e., when the aircraft moves from one position to another.

Some embodiments herein refer to a method how to determine a spectrum band, including mobile licensed, license-exempt and unlicensed, for a wireless in-cabin communication during the whole flight, i.e. to be used by in-cabin communications during/before/after the flight.

Some embodiments may show both how an aircraft can provide input to spectrum selection and how stages during a lifetime of a flight can be tied into spectrum selection.

According to some embodiments, seamless wireless in-cabin communication during the whole flight may take into consideration regulations for a particular flight area.

Figure 1:
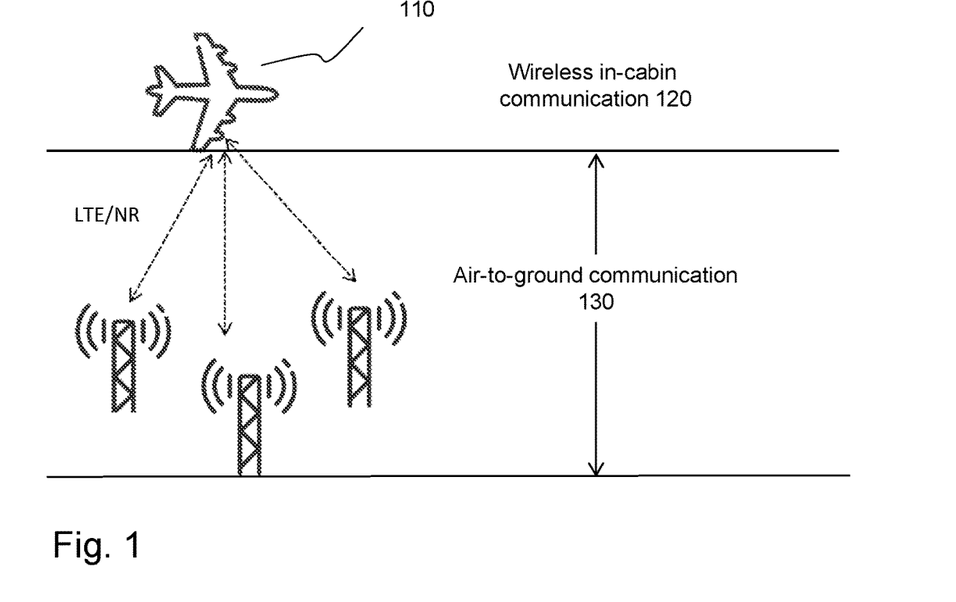
FIG. 1 is a schematic overview of an exemplifying an overview of an exemplifying system in which embodiments herein may be implemented.

Although the subject-matter described herein may be implemented in any appropriate type of system using any suitable components, the embodiments disclosed herein are described in relation to wireless in-cabin communication 120 illustrated in FIG. 1.

FIG. 1 illustrates a wireless in-cabin communication 120 and an air-to-ground communication 130. The air-to-ground backhaul communication 130 may be based on an air-to-ground backhaul network, also referred to as air-to-ground system, a mobile network operator (MNO) ground network, a ground network, or a backhaul network. A ground network is shown in FIG. 1, where as an example an LTE/NR is used as a Radio Access Technology (RAT) therein. The skilled person will appreciate that, the air-to-ground communication 130 may be also based on other wireless technologies, e.g., a satellite link.

A wireless in-cabin system 300 (see FIG. 2), also referred to as a wireless in-cabin network, in-cabin system or in-cabin network, provides the wireless in-cabin communication 120. For simplicity, the wireless in-cabin system 300 of FIG. 1 only depicts one network node 320 and one user equipment 330. In practice, a wireless in-cabin system 300 may further include additional network nodes 320 and user equipment 330, any additional elements suitable to support communication between wireless devices or between a wireless device and another communication device, such as a landline telephone, a service provider, or any other network node or end device. The wireless in-cabin system 300 may provide communication and other types of services to one or more wireless devices to facilitate the wireless devices' access to and/or use of the services provided by, or via, the wireless in-cabin system 300.

The wireless in-cabin system 300 may use various Radio Access Technology (RAT) to provide the wireless in-cabin communication 120 between the network node 320 and the user equipment 330 may use. Examples of the RAT may be, e.g., Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the Institute of Electrical and Electronics Engineers (IEEE) 802.11 standards; and/or any other appropriate wireless communication standard, such as the Worldwide Interoperability for Microwave Access (WiMax), Bluetooth, Z-Wave and/or ZigBee standards.

As used herein, the network node 320 refers to equipment capable, configured, arranged and/or operable to use any one of the different RATs and communicate directly or indirectly with the user equipment 330 and/or with other network nodes 320 or equipment in the wireless in-cabin system to enable and/or provide wireless access to the user equipment 330 and/or to perform other functions, e.g., administration, in the wireless in-cabin network. Examples of the network node 320 include, but are not limited to, access points (APs), e.g., radio access points, base stations (BSs) (e.g., radio base stations, Node Bs, evolved Node Bs (eNBs), NR NodeBs (gNBs)), Wi-Fi hotspot device, radar transceiver device, Bluetooth device, and a satellite transceiver. Base stations may be categorized based on the amount of coverage they provide, or their transmit power level, and may then also be referred to as femto base stations, pico base stations, micro base stations, or macro base stations. A base station may be a relay node or a relay donor node controlling a relay. The network node 320 may also include one or more or all parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of the network node 320 include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes, Operation and Maintenance nodes, Object Storage Server nodes, Self-Organizing Network nodes, positioning nodes, e.g., Enhanced Serving Mobile Location Center E-SMLCs, and/or mobile data terminal (MDTs). As another example, the network node 320 may be a virtual network node 320 as described in more detail below. More generally, however, the network node 320 may represent any suitable device, or group of devices, capable, configured, arranged, and/or operable to enable and/or provide the user equipment 330 with access to the wireless in-cabin network or to provide some service to the user equipment 330 that has accessed the wireless in-cabin network.

As used herein, the user equipment (UE) 330, also called wireless device (WD), refers to a device capable, configured, arranged and/or operable to use any one of the different RATs and communicate wirelessly with the network node 320 and/or other wireless devices. The wireless device 330 is served by the network node 320 using a RAT. Unless otherwise noted, the term WD may be used interchangeably herein with. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node 320. The WD may in this case be a machine-to-machine (M2M) device, which may in a 3GPP context be referred to as an Machine-Type-Communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, etc., personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

A component 310 for determining spectrum, illustrated in FIG. 1, is comprised in the wireless in-cabin system 300, for determining spectrum used during the wireless in-cabin communication 120 between the network node 320 and the user equipment 330. However as an alternative, some functions of the component 310 for determining spectrum may not necessary be comprised in the wireless in-cabin system 300, and may be comprised in the air-to-ground system 130. The component 310 for determining spectrum will be described in detail below.

Figure 3:
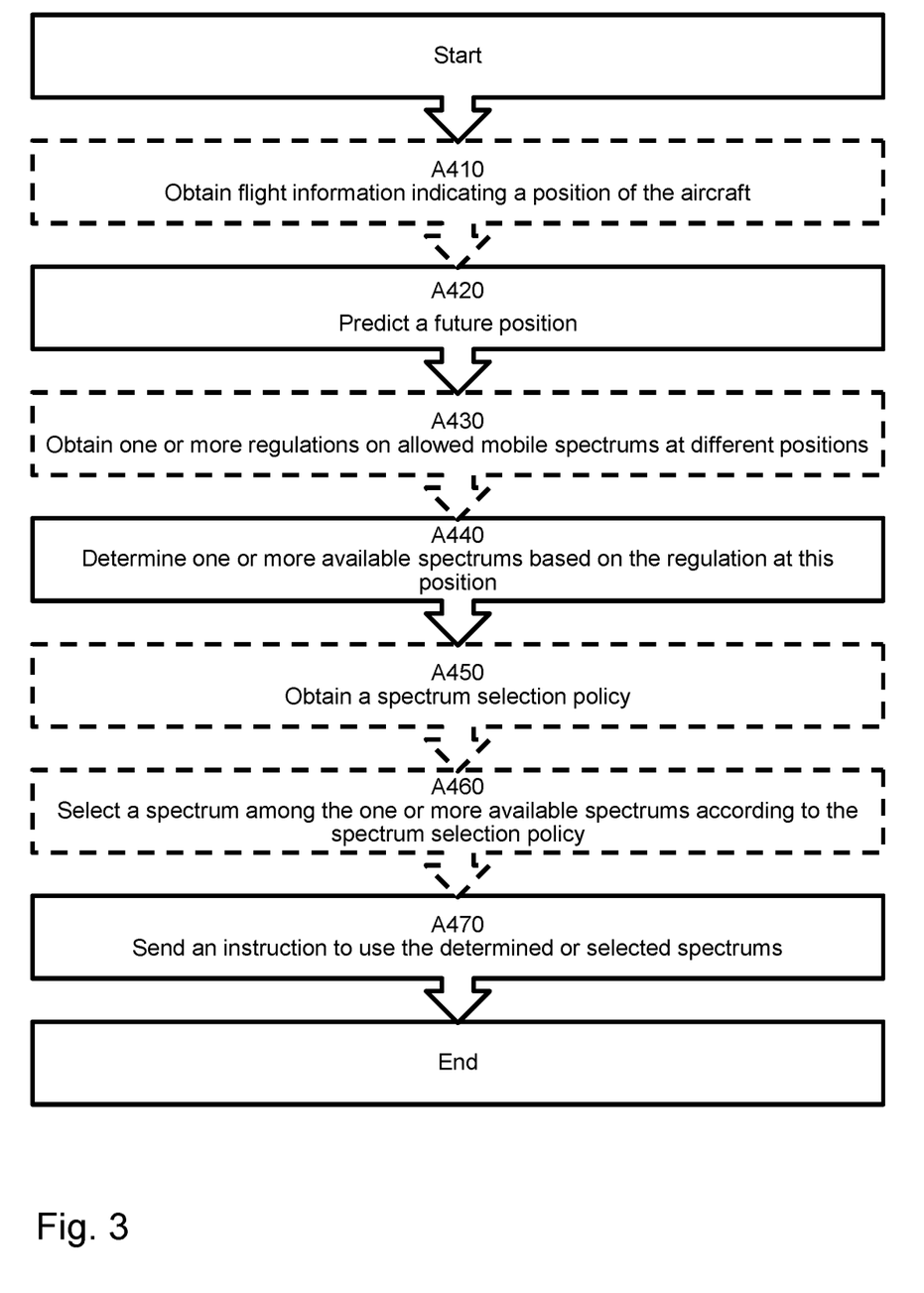
FIG. 3 is a flowchart illustrating embodiments of the method in the component.

An example a flowchart depicting embodiments of a method performed by the component 310, e.g., for determining a spectrum to be used for a wireless in-cabin communication 120 between a user equipment 330 and a network node 320 which are within an aircraft 110, is shown in FIG. 3. The flowchart will be described more in detail in the following. The method may comprise one or more of the following actions which actions may be taken in any suitable order.

In action A410 the component 310 obtains flight information 370 indicating a position of the aircraft 110, e.g., from an aircraft system.

The aircraft 110 may also be referred to as an airplane, an aeroplane etc. According to some embodiments, the aircraft is a commercial aircraft.

The flight information 370 may also be referred to as flight data, or flight data information throughout the disclosure. According to some embodiments, the flight information 370 may comprise at least one of a height of the aircraft, and a geographical position, in order to indicate the position of the aircraft. According to some embodiments, the flight information 370 further comprises one or more of: a speed, a direction, a flight area, a stage of the flight, and a level of the flight.

The stage of the flight may comprise, e.g., "at gate", "ascending", "en route", "descending", etc.

According to some embodiments, the flight information 370 can be collected: when requested by other systems, when it is available in the aircraft-specific system, and/or at regular intervals, etc.

According to some embodiments, the position of the aircraft may be a current position, or a future position of the aircraft. In case of the future position, the method may further comprise action A420.

In action A420, the component 310 may optionally predict the future position based on the flight information 370. In this case, the flight information 370 may comprise at least one of a height of the aircraft, a geographical position, a speed, a direction and a flight area.

In action A430, the component 310 may optionally obtain, e.g. from a database, one or more regulations 350 on an allowed mobile spectrum at different positions. The action A430 may only be performed when the component 310 does not have the regulations 350 locally, or when the component 310 updates the regulations 350.

The allowed spectrum comprises one or more of: licensed, unlicensed and license-exempt spectrums. The spectrum may also referred to as a band, a spectrum band, a mobile spectrum, a mobile band, a mobile spectrum band, radio spectrum, carrier/spectrum band etc.

In action A440, the component 310 determines one or more available spectrums based on a regulation on an allowed spectrum 350 corresponding to the flight information 370 at the position.

Regulations 350 on a use of radio frequencies (RF), is used for a spectrum management, to mitigate radio spectrum pollution and maximize the benefit of usable radio spectrum. Most countries consider RF spectrum as an exclusive property of the state. The RF spectrum is a national resource, so different countries may have different regulations. A regulation 350, may be also called a radio spectrum regulation.

For a wireless in-cabin communication there is a variety of spectrum that can be used, including mobile licensed and unlicensed bands. However for airplanes there are regulations that limit the use of licensed and unlicensed spectrum based on the height of the aircraft. According to some embodiments, when the flight information 370 comprises at least one of a height and a geographical position of the aircraft, and the regulation 350 may define an allowed spectrum corresponding to the height and/or the geographical position. For instance, the radio spectrum regulations 350 for mobile bands may limit the use of certain bands for transmitters in aircraft at different heights, e.g., that a specific band cannot be used when the aircraft is below a specified height. According to another example, when the flight information 370 comprises a stage of the flight, and the regulation defines an allowed spectrum 350 corresponding to the stage. For instance, there can also be regulations 350 for certain spectrum bands that relate the usage conditions to the aircraft flight stage, e.g., "at gate", "ascending", "en route", "descending".

According to some embodiments, the regulation 350 further defines an allowed spectrum corresponding to aircraft information 360, the determining of the one or more available spectrums is further based on the aircraft information 360.

The aircraft information 360 may comprise at least one of: an aircraft type, an aircraft identifier, an aircraft certification category, a fuselage RF shielding capability and a noise floor capability. Further, the regulations 350 can relate usage conditions to the properties and systems of the aircraft itself, e.g., fuselage RF shielding and mobile receive band noise floor control systems.

Similar to the flight information 370, the aircraft information 360 can be collected when requested by other systems, when it is available in the aircraft-specific system, at regular intervals, etc.

In action A450, the component 310 may optionally obtain a spectrum selection policy 340, if it is not stored in local.

In action A460, the component 310 may optionally select a spectrum among the one or more available spectrums according to the spectrum selection policy 340.

According to some embodiments, the spectrum selection policy 340 defines a preferred spectrum corresponding to at least one of: an operator providing the wireless in-cabin communication 120, a roaming agreement, a type of the aircraft, a quality of experience, a capacity, redundancy, a spectrum used in a corresponding air-to-ground communication, and a stage of the flight when the flight information 370 comprises the stage of the flight.

The spectrum selection policy 340 may also define a preferred spectrum corresponding to certain weather. For instance, component 310 can also make use of weather information located around the aircraft for optimization of the radio link, e.g. taking care of the impact of rain etc. in a high frequency use case.

In action A470, the component 310 sends, to at least one of the user equipment 330 and the network node 320, an instruction to use the determined one or more available spectrums, or the selected spectrum when action A460 is performed, during the wireless in-cabin communication 120.

When two or more bands are selected in action 460, or determined in action 430, all of them may be informed.

According to an implementation form, a 3GPP-based wireless in-cabin network for an aircraft can be built to be able to access different carriers on different spectrum bands including licensed mobile bands e.g., the so called 800 MHz, 900 MHz, 1.8 GHz, 2.0 GHz, and 2.6 GHz bands and license-exempt/unlicensed bands e.g. the so called 5 GHz band. Two or more carriers can also be used simultaneously including combinations of a licensed mobile band and an unlicensed band.

In some special situation, when no available spectrum can be determined or selected at a certain position, the wireless in-cabin communication 120 may be turned off.

The method may be performed by a component 310, which comprises respective functions to perform the above actions.

The method may be performed when the flight information 370 is updated, and/or on a request from the user equipment 330 or the network node 320.

Figure 2:
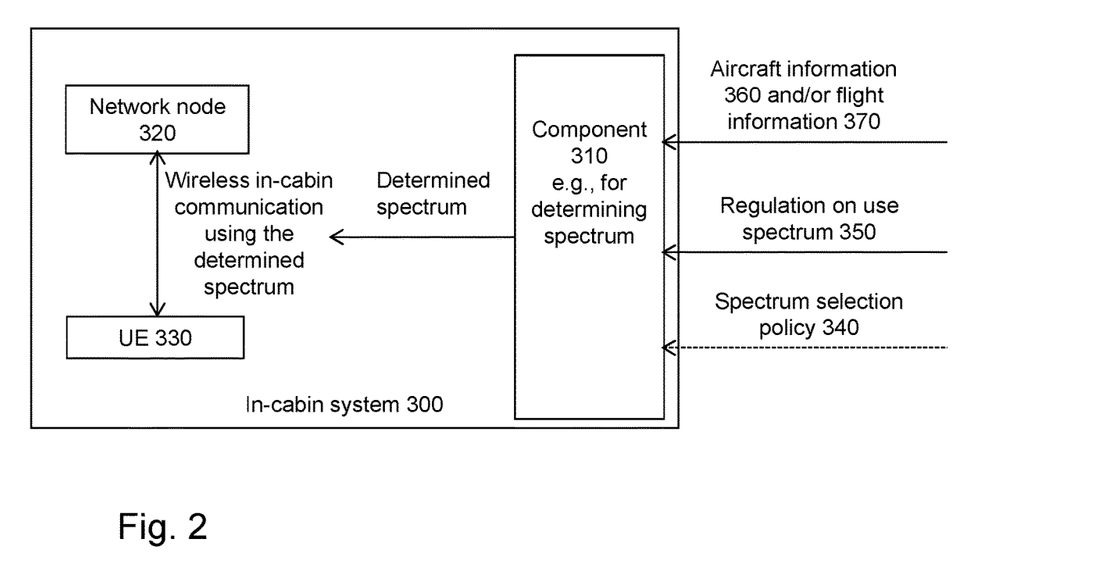
FIG. 2 is a block diagram illustrating embodiments of a wireless in-cabin system and a component according to embodiments herein.

According to some embodiments, the method deals with how to select which carrier/spectrum band, or combination of carriers/bands, to use in the in-cabin communication 120. FIG. 1 and FIG. 2 show diagrams of the wireless in-cabin communication embodiments that realize the method.

A further embodiment is provided with respect to a component 310 for determining spectrum as an example.

The component 310 may interface with an aircraft system to collect, and if needed, reformat, information about the aircraft and the flight information 360, 370. The flight information 370 can be collected based on 3-D positioning information at the aircraft. The flight information 370 may include the horizontal and vertical location of the aircraft, etc. The aircraft and the flight information 360, 370 can be collected when requested by other systems, when it is available in the aircraft-specific systems, at regular intervals, or by other means.

The aircraft information 360 may comprise one or more of:
type of aircraft, such as make, model and the like
aircraft identifier
aircraft certification category or class
aircraft fuselage RF shielding capability for mobile bands, also referred to as capability on RF shielding, e.g.,
shielding installed or not installed
suppression level between incident and exit power densities on the mobile bands in decibel (dB)
mobile receive band noise floor control capability in aircraft, also referred to as capability on noise floor control, e.g.,
whether a Network Control Unit (NCU) is installed to remove the visibility of ground networks to terminals inside the aircraft cabin
adaptive capability of mobile receive band noise floor control, e.g.,
whether an installed NCU increases/decreases its noise floor generation based on current flight conditions such as aircraft height and/or measured ground/terrestrial network receive power
and the like.

Some aircraft information 360 may make other information implicit, e.g., an aircraft certification category/class, aircraft type, or aircraft identity can, by pre-configuration, define the aircraft's capabilities on RF shielding and noise floor control.

The flight information may comprise one or more of:
height above ground and/or sea level
geographical position, e.g., in latitude and longitude coordinates
flight area, e.g.,
flight route segments
flight route geographical regions, e.g., countries, states, counties, municipalities, etc., that will be passed
stage of flight, e.g., "at gate", "ascending", "en route", "descending"
Level of the flight, such as whether there is any other aircraft between the ground nodes and the aero plane, etc.
Speed
Direction
Weather information
and the like According to some embodiment, the flight information can be obtained from one or more of: automatic dependent surveillance-broadcast (ADS-B), Global Positioning System (GPS), Triangulation of radio signals to determine position, ground base stations, e.g., e-node B, where position information and predictions could potentially be transferred to the aircraft.

According to some embodiment, a regulation 350 about available mobile spectrum allocations for the position of flight may be used. The regulation 350 may include, but is not limited to, one or more of:
Mobile spectrum bands that are allocated and/or available for use in a geographical area, specified using, e.g.,
3GPP band numbering and available carrier bandwidth in the mentioned bands
national administrations' designations
Authorization conditions for the mobile spectrum bands
Licensed, license-exempt, unlicensed or other authorization
Identity of the licensee/operator for licensed bands
Specific regulatory requirements for each mobile band for airborne use inside aircraft, e.g.,
Stages of flight when the band can be used, e.g., "at gate", "ascending", "en route", "descending".
Protection requirements towards ground/terrestrial mobile networks, and/or other Radio Services, e.g.,
Aircraft fuselage RF shielding for mobile bands. In other words, the fuselage of the aircraft may have radio frequency shielding in the mobile bands, either by design or by installing additional equipment, ensuring that the emissions of a transmitter inside the aircraft is sufficiently attenuated so as not to interfere with a mobile network outside of the aircraft.

Noise floor control of mobile receive bands. In other words, the aircraft may have a Network Control Unit (NCU) transmitting noise in the mobile bands within the interior of the fuselage to prevent mobile terminals inside the fuselage to connect to mobile networks outside the aircraft.

Minimum height of aircraft above ground/sea level for operation, i.e., transmitters of the base station inside the aircraft can only transmit in the mobile band if the aircraft is at, or above, a certain height/altitude over the ground/sea level.

Available radio capability of the transceiver available in the aero plane, and the like.

The regulations 350 can be stored in advance or fetched, e.g., from aircraft-external spectrum access systems and/or a Database in real time, e.g., via an aircraft backhaul system, such as a satellite or air-to-ground backhaul network.

A list of bands in the Database can be limited to the installed bands of the in-cabin network in the specific aircraft.

The Database may also serve as storage for the aircraft and flight information 360, 370. The Database contains information about the available mobile spectrum allocations and regulations 350 for the area of flight. The Database can be updated on request from the in-cabin system, or another mobile network system, at regular intervals, or at any other time as needed.

The component 310 may utilize the aircraft and flight information 360, 370 and regulations 350 to determine feasible carrier/spectrum bands that the in-cabin network can use.

The determination can be performed for the current position and flight stage of the aircraft as well as for future, planned positions and stages based on the flight area, e.g., route segments and geographical regions.

To determine the one or more available spectrums based on the regulation 350, the component 310 may compare the flight information, e.g., position, height, flight area, flight stage, and the aircraft information 360, e.g., aircraft type, ID, fuselage RF shielding, noise floor control capability, with the configured mobile spectrum bands in the Database and the respective geographical and airborne use regulatory constraints.

A band is feasible if it fulfills all constraints, otherwise not.

The feasibility of a band can be conditioned on that a Network Control Unit (NCU), if available, is in operation. The purpose of the Network Control Unit (NCU) may be to transmit noise in the mobile bands within the interior of the fuselage to prevent mobile terminals inside the fuselage to connect to mobile networks outside the aircraft.

The feasibility of a band can be conditioned on that an adaptive NCU, if available, is in operation and that its noise floor control is adapted to current flight conditions, such as aircraft height, and/or measured ground/terrestrial network receive power. The amount of noise needed to prevent terminals inside the aircraft fuselage to connect to a ground/terrestrial network may depend on the received signal strength of the ground/terrestrial network inside the aircraft fuselage. For example, at higher altitude the received signal strength can be lower compared to what it is at lower altitude, and, hence a lower noise level needs to be generated. Similarly, close to airports or over cities and other areas with dense mobile network deployments the received signal strength can be higher, and, hence, a higher nose level needs to be generated.

The component 310 may select a spectrum among the one or more available spectrums according to a spectrum selection policy 340. Zero, one, or two or more spectrum bands can be selected. The spectrum selection policies for the in-cabin network, may include, but not limited to, rules on preferred spectrum corresponding to one or more of:

Identity of operator(s) of in-cabin network

Roaming agreements and conditions. The Roaming agreement and conditions may be connected to the value chains and business roles that are valid for the aircraft. In case there is a value chain where there is one or several operators in the in-cabin communication solution they all need a roaming agreement with the operator(s) that are providing air to ground communication on ground level. Commercial conditions can vary between different in-cabin communication operators and ground station operators e.g. availability of bands and priorities for Quality of Service (QoS) for different services.

Preference rules on spectrum bands, e.g.,

Use bands where in-cabin operator(s) have licenses for ground/terrestrial use. The use of bands for the in-cabin communication solution and the air to ground communication can be optimized: e.g., if the in-cabin communication has the same band inside the aircraft as the band used in the air to ground communication, there may be considerations done to either limit interference with noise control, or change bands for either the in-cabin communication or for the air to ground communication to secure overall communication performance. The availability of bands is connected to each geographical area and is regulated by public agreements for spectrums.

a stage of the flight, e.g., use only license-exempt/unlicensed band during "ascending" and "descending" stages a Quality of Experience (QoE), a capacity, redundancy etc.

a spectrum used in an air-to-ground communication

The component 310 may send, to at least one of the user equipment 330 and the network node 320, an instruction to use the one or more available spectrums. For instance, If zero bands are selected then the in-cabin system is turned off.

If two or more bands are selected then the in-cabin system can use them simultaneously, if desired Network Control Unit (NCU) operation is verified if required for feasibility Similarly, adaptive NCU operation is verified if required for feasibility and the like.

The spectrum use decision can be updated when other systems, in particular the

Figure 4:
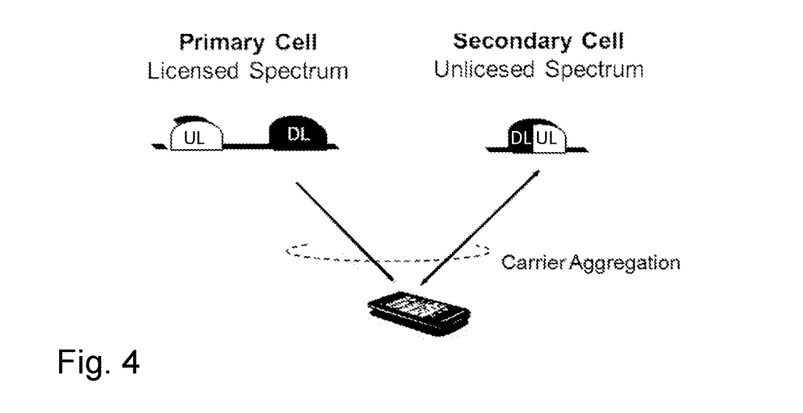
FIG. 4 schematically illustrates a licensed-assisted access to unlicensed spectrum using LTE carrier aggregation.

In case of licensed mobile band and an unlicensed band are used simultaneously, Licensed Assisted Access, as shown in FIG. 4, may be used. FIG. 4 illustrates a licensed-assisted access (LAA) to unlicensed spectrum using LTE carrier aggregation. The unlicensed spectrum, e.g. in 5-6 GHz range such between: 5150 MHz-5925 MHz, can be simultaneously used by multiple different technologies e.g. between LTE and IEEE Wi-Fi. The "Licensed-Assisted Access" (LAA) intends to allow LTE equipment to also operate in an unlicensed radio spectrum. Note that, the same LAA concept can be used in other spectrum, e.g., 3.5 GHz in North America. In LAA mode, devices connect in the licensed spectrum, also referred to as primary cell or PCell, and use carrier aggregation to benefit from additional transmission capacity (both uplink and downlink) in the unlicensed spectrum, also referred to as secondary cell or SCell. Therefore UE can be configured with one or more SCells in the unlicensed spectrum.

The unlicensed spectrum may be shared with other wireless technologies, e.g. Wi-Fi, radar, Bluetooth, fixed satellite system, etc.

There will also be LTE systems operating in unlicensed spectrum completely in a standalone manner, also called standalone access of unlicensed spectrum. The difference between LAA and "standalone LTE in unlicensed band" will be that there will not be any licensed carrier to be aggregated with unlicensed carrier in standalone usage, while an unlicensed LTE carrier is always aggregated with licensed carrier in LAA operations. Standalone operation means that, uplink (UL) will also be allowed in unlicensed spectrum usage of LTE. Since there will not be any support from licensed carrier, the standalone LTE system is responsible for all functionalities in unlicensed spectrum.

In a standalone operation, a UE may be capable of only using a single carrier, or be capable of aggregating more than one unlicensed carriers at the same. In that case, both PCell and SCell(s) will be in unlicensed spectrum.

To perform the method embodiments corresponding to FIG. 3, the component 310 of FIG. 3 is shown is discussed herein. The component 310 may comprise the following arrangement depicted in FIG. 5 for determining a spectrum to be used for a wireless in-cabin communication 120 between a user equipment 330 and a network node 320 which are within an aircraft.

Figure 5:
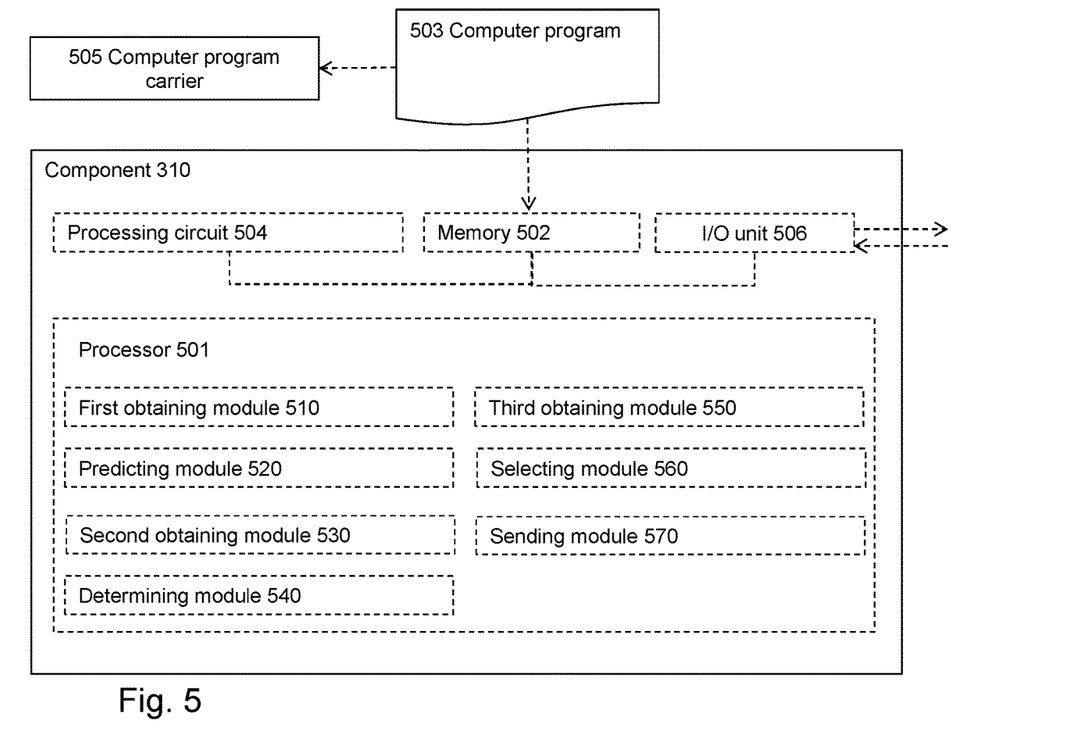
FIG. 5 is a block diagram illustrating embodiments of the component.

In some embodiments, the component 310 may comprise a processor 501, for performing the methods described above.

According to some embodiments herein, the component 310 and/or the processor 501 comprises a processing circuit 504 as an exemplifying hardware module. Accordingly, the processor 501 may be embodied in the form of, or 'realized by', the processing circuit 504. The instructions may be executable by the processing circuit 504, whereby the component 310 is operative to perform the methods of FIG. 3. As another example, the instructions, when executed by the component 310 and/or the processing circuit 504, may cause the component 310 to perform the method according to FIG. 3.

The component 310 may further comprise a memory 502. The memory may comprise the Database for storing the flight information 370, the aircraft information 360, and/or the regulation 350 on an allowed spectrum and/or the spectrum selection policy 340.

In some embodiments, the processor 501 may comprise one or more circuits 510-570 (see below), which are also referred to as modules, to perform the actions A410-470, respectively. The modules may be embodied in the form of one or more hardware modules and/or one or more software modules.

According to some embodiments herein, the component 310 is configured, e.g., by means of the circuits 510-570, to perform the actions A410-470, respectively, as below.

The component 310 is configured, e.g., by means of a first obtaining module 510, to obtain the flight information 370 indicating a position of the aircraft.

According to some embodiments, the component 310 is configured, e.g. by means of a predicting module 520, to predict the future position based on the flight information 370, when the flight information 370 comprises at least one of a height of the aircraft, a geographical position, a speed, a direction and a flight area.

The component 310 is configured, e.g., by means of a second obtaining module 530, to obtain, e.g. from a database, the one or more regulations 350 on an allowed mobile spectrum at different positions.

The component 310 is configured, e.g., by means of a determining module 540, to determine one or more available spectrums based on a regulation 350 on an allowed spectrum corresponding to the flight information 370 at the position.

The component 310 is configured, e.g., by means of a third obtaining module 550, to obtain the spectrum selection policy 340, if it is not saved in local.

The component 310 is configured, e.g., by means of a selecting module 560, to select a spectrum among the one or more available spectrums according to a spectrum selection policy 340.

The component 310 is configured, e.g., by means of a sending module 570, to send, to at least one of the user equipment 330 and the network node 320, an instruction to use the one or more available spectrums determined by the determining module 540, or the spectrum selected by the selecting module 460, during the wireless in-cabin communication 120.

The above modules 510-570 are logical concept, can also be referred to as functions, or circuits. According to an implementation form, those functions 510-570 may be distributed in different physical entities in the wireless in-cabin system e.g., distributed cloud implementation on-board the aircraft or some of them may be even distributed in different physical entities in the air-to-ground system. According to another implementation form, they may be comprised in a single physical entity in the wireless in-cabin system. An advantage of comprising the modules 510-570 in the in-cabin system, no matter in a single or different physical entities, may be long delay is avoided. Due to the backhaul network may be capacity limited and have long delays, particularly if satellite links are used. In this case an on-board location may be more feasible.

The above modules 510-570 can also be referred to as circuits, as exemplifying hardware modules. In other examples, one or more of the aforementioned exemplifying hardware modules may be implemented as one or more software modules.

The memory 502 may comprise, such as contain or store, instructions, e.g. in the form of a computer program 503, which may comprise computer readable code units.

FIG. 5 further illustrates a computer program carrier 505, or program carrier, which comprises the computer program 503 as described directly above.

Moreover, component 310 may further comprise an Input/Output unit 506, for receiving or sending a signal.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method of using a component of an in-cabin system located within an aircraft for determining a spectrum to be used for a wireless in-cabin communication between a user equipment and a network node which are also located within the aircraft, the method comprising:
- obtaining flight information indicating a position of the aircraft from an aircraft system, wherein the flight information includes geographical position and altitude of the aircraft;
- predicting a future position of the aircraft based on speed, direction and flight area of the aircraft;
- determining one or more available spectrums for the wireless in-cabin communication based on a regulation on an allowed spectrum corresponding to the flight information at the position of the aircraft and the predicted future position of the aircraft; and
- sending, to the user equipment and the network node, an instruction to use the one or more available spectrums determined for the wireless in-cabin communication between the user equipment and the network node.

2. The method according to claim 1, further comprising: selecting a spectrum among the one or more available spectrums according to a spectrum selection policy.

3. The method according to claim 2, wherein the spectrum selection policy defining a preferred spectrum corresponding to at least one of: an operator providing the wireless in-cabin communication, a roaming agreement, an aircraft type, a quality of experience, a capacity, redundancy, a spectrum used in a corresponding air-to-ground communication, and a stage of the flight when the flight information comprises the stage of the flight.

4. The method according to claim 1, wherein the flight information further comprises at least one of: a speed, a direction, a flight area, a stage of the flight, and a level of the flight.

5. The method according to claim 1, wherein the determining of the one or more available spectrums is further based on aircraft information.

6. The method according to claim 5, wherein the aircraft information comprises at least one of: an aircraft type, an aircraft identifier, an aircraft certification category, a fuselage RF shielding capability, and a noise floor capability.

7. A component of an in-cabin system located within an aircraft for determining a spectrum to be used for a wireless in-cabin communication between a user equipment and a network node which are also located within the aircraft, the component comprises a processor configured to:
- obtain flight information indicating a position of the aircraft from an aircraft system, wherein the flight information includes geographical position and altitude of the aircraft;
- predict a future position of the aircraft based on speed, direction and flight area of the aircraft;
- determine one or more available spectrums for the wireless in-cabin communication based on a regulation on an allowed spectrum corresponding to the flight information at the position of the aircraft and the predicted future position of the aircraft; and
- send, to the user equipment and the network node, an instruction to use the one or more available spectrums determined for the wireless in-cabin communication between the user equipment and the network node.

8. The component according to claim 7, wherein the processor is further configured to:
- select a spectrum among the one or more available spectrums according to a spectrum selection policy.

9. The component according to claim 8, wherein the flight information further comprises at least one of: a speed, a direction, a flight area, a stage of the flight, and a level of the flight.

10. The component according to claim 7, wherein the processor is further configured to determine the one or more available spectrums further based on aircraft information, which comprises at least one of: an aircraft type, an aircraft identifier, an aircraft certification category, a fuselage RF shielding capability and a noise floor capability.

11. The component according to claim 8, wherein the spectrum selection policy defining a preferred spectrum corresponding to at least one of: an operator providing the wireless in-cabin communication, a roaming agreement, an aircraft type, a quality of experience, a capacity, redundancy, a spectrum used in a corresponding air-to-ground communication, and a stage of the flight when the flight information comprises the stage of the flight.

12. A non-transitory machine-readable storage medium comprising program code which, when executed on a processor of a component of an in-cabin system located within an aircraft for determining a spectrum to be used for a wireless in-cabin communication between a user equipment and a network node which are also located within the aircraft, is capable of causing the component to perform operations comprising:
- obtaining flight information indicating a position of the aircraft from an aircraft system, wherein the flight information includes geographical position and altitude of the aircraft;
- predicting a future position of the aircraft based on speed, direction and flight area of the aircraft;
- determining one or more available spectrums for the wireless in-cabin communication based on a regulation on an allowed spectrum corresponding to the flight information at the position of the aircraft and the predicted future position of the aircraft; and
- sending, to the user equipment and the network node, an instruction to use the one or more available spectrums determined for the wireless in-cabin communication between the user equipment and the network node.

13. The non-transitory machine-readable storage medium according to claim 12, wherein the component to perform further operations comprising selecting a spectrum among the one or more available spectrums according to a spectrum selection policy.

14. The non-transitory machine-readable storage medium according to claim 12, wherein the determining of the one or more available spectrums is further based on aircraft information.

15. The non-transitory machine-readable storage medium according to claim 14, wherein the aircraft information comprises at least one of: an aircraft type, an aircraft identifier, an aircraft certification category, a fuselage RF shielding capability, and a noise floor capability.

* * * * *